United States Patent
Bussières-Dicaire et al.

(10) Patent No.: US 11,679,415 B2
(45) Date of Patent: Jun. 20, 2023

(54) CONDITIONING, BIOTREATMENT AND COMPOSTING OF CONSTRUCTION AND DEMOLITION DEBRIS FINES

(71) Applicant: SANEXEN ENVIRONMENTAL SERVICES INC., Brossard (CA)

(72) Inventors: Jean-Simon Bussières-Dicaire, Laval (CA); Thomas Drouin, Verdun (CA); Mathieu Germain, Brossard (CA); Martin Bureau, Montréal (CA); Jean Paquin, Sainte-Julie (CA)

(73) Assignee: SANEXEN ENVIRONMENTAL SERVICES INC., Montreal (CA)

( * ) Notice: Subject to any disclaimer, the term of this patent is extended or adjusted under 35 U.S.C. 154(b) by 354 days.

(21) Appl. No.: 17/000,273

(22) Filed: Aug. 22, 2020

(65) Prior Publication Data
US 2021/0053091 A1    Feb. 25, 2021

Related U.S. Application Data

(60) Provisional application No. 62/890,120, filed on Aug. 22, 2019.

(51) Int. Cl.
*B07B 1/28*    (2006.01)
*B07B 1/46*    (2006.01)
(Continued)

(52) U.S. Cl.
CPC ............... *B07B 1/28* (2013.01); *B03B 4/065* (2013.01); *B03B 7/00* (2013.01); *B03B 9/063* (2013.01);
(Continued)

(58) Field of Classification Search
CPC ......... B07B 1/28; B07B 1/4609; B03B 4/065; B03B 7/00; B03B 9/063; B03B 9/065;
(Continued)

(56) References Cited

U.S. PATENT DOCUMENTS

2021/0053091 A1* 2/2021 Bussières-Dicaire ...................... C04B 18/0445

FOREIGN PATENT DOCUMENTS

| CA | 3063184 A1 * | 5/2020 | ............... B03C 1/23 |
| CN | 1173155 A * | 2/1998 | ............ B03B 9/061 |

(Continued)

OTHER PUBLICATIONS

"Guidance for Beneficially Reusing Construction and Demolition Debris Fines"; Prepared for The Construction and Demolition Recycling Association; Prepared by The Department of Environmental Engineering Sciences Engineering School of Sustainable Infiastructure and Environment University of Florida Timothy Townsend, Principal Investigator Steven Laux, PE, Senior Lecturer Jing Su, Graduate Research Assistant Malak Anshassi, Graduate Research Assistant; Aug. 1, 2018.
(Continued)

*Primary Examiner* — Terrell H Matthews
(74) *Attorney, Agent, or Firm* — Lavery, De Billy, LLP; Gwendoline Bruneau (57) ABSTRACT

A method of valuation of raw fines materials, comprising selectively screening, biotreatment or composting of raw fines materials or selection as fillers in composites. The method comprises screening the raw fines materials to Grade 1 comprising fines materials of a size of at most about 5 mm and Grade 2 comprising fines materials of a size larger than about 5 mm; and at least one of: A) bio-oxydating organic contaminants of the Grade 1; by adding and mixing organic amendment under controlled temperature, nutrients content and water content conditions and monitoring a content of organic contaminants until the content of organic contaminants stops decreasing; and B) composting the Grade 1; by adding and mixing organic amendment under controlled temperature, nutrients content and water content conditions,
(Continued)

and monitoring pathogens content and respiration rate; and stopping the addition of organic amendment upon detection of absence of pathogens at a predetermined respiration rate.

17 Claims, 8 Drawing Sheets

(51) Int. Cl.
    *C08K 11/00*     (2006.01)
    *C05F 17/90*     (2020.01)
    *C05F 17/60*     (2020.01)
    *B03B 4/06*     (2006.01)
    *C04B 18/04*     (2006.01)
    *B03B 9/06*     (2006.01)
    *B03B 7/00*     (2006.01)
    *C05F 17/10*     (2020.01)

(52) U.S. Cl.
    CPC ............ *B03B 9/065* (2013.01); *B07B 1/4609* (2013.01); *C04B 18/0445* (2013.01); *C04B 18/0481* (2013.01); *C05F 17/10* (2020.01); *C05F 17/60* (2020.01); *C05F 17/989* (2020.01); *C08K 11/005* (2013.01)

(58) Field of Classification Search
    CPC ............ C04B 18/0445; C04B 18/0481; C08K 11/005
    USPC ........................................................ 209/632
    See application file for complete search history.

(56) References Cited

FOREIGN PATENT DOCUMENTS

| CN | 109013656 A | * | 12/2018 | ............... B09B 3/00 |
| EP | 0912310 B1 | * | 11/2001 | |
| EP | 1447196 A1 | * | 8/2004 | ........... B09B 3/0033 |

OTHER PUBLICATIONS

"Model Compost Rule Template", US Composting Council, Apr. 4, 2013.

Ministère Du Développement Durable, De L'Environnement Et De La Lutte Contre Les Changements Climatiques, Guide sur le recyclage des matieères résiduelles fertilisantes—Édition de décembre 2015, Dépôt légal—Bibliothèque et Archives nationales du Québec, 2015.

Beaulieu, Michel. 2019. Guide d'intervention—Protection des sols et réhabilitation des terrains contaminés. Québec, ministère de l'Environnement etde la Lutte contre les changements climatiques, 219 p. + annexes. Dépôt légal—2019 Bibliothèque et Archives nationales du Quéebec, Gouvernement du Québec, 2019.

LègisQuébec, chapter Q-2, r. 37, Land Protection and Rehabilitation Regulation, Environment Quality Act, (chapter Q-2, ss. 31.69, 95.1, 115.27, 115.34 and 124.1)., O.C. 216-2003; I.N. Dec. 1, 2019, Chapter I, Applicable Limit Values and Categories of Activities Concerned.

LégisQuébec, chapter Q-2, r. 18, Regulation respecting the burial of contaminated soils, Environment Quality Act, (chapter Q-2, ss. 31.52, 70, 95.1, 115.27, 115.34, 118.3.5 and 124.1), O.C. 843-2001; I.N. Dec. 1, 2019.

Ann Marie Otis, UL 94, Standard for Safety, Tests for Flammability of Plastic Materials for Parts in Devices and Appliances, Jun. 27, 2020.

\* cited by examiner

| | Material identification | | | | | | Fines screen below 5mm | Test 1 - Biotreatment | | | | | |
|---|---|---|---|---|---|---|---|---|---|---|---|---|---|
| | Step of the test | | | | | | | Temperature homogenisation stirring | | | | End of test | |
| | Sample indentification | | | | | | Fine-26030019-1 | B1-b1-20190430 | B1-b1-a-20190506 | B1-b1-b-20190506 | B1-b1-c-20190506 | Essai Bio-07082019 | Essai 1-190716 |
| Contamination range | <C1 | C1-C2 | ≤A | B-C | ≥C | ≥ Appendix I of RESC | | | | | | | |
| Criteria and limite value | Guide MRF | | Guide d'intervention / RPRT | | | RESC | | | | | | | |
| | C1 | C2 | A | B/Annexe | C/Annexe | Appendix I | | | | | | | |
| Metals and Metalloids (mg/kg) | | | | | | | | | | | | | |
| Aluminium | - | - | * | * | * | * | 7 370 | - | - | - | - | - | 4 960 |
| Antimoine | - | - | * | * | * | * | - | - | - | - | - | - | < 20 |
| Silver | - | - | 2 | 20 | 40 | 200 | 1,1 | - | - | - | - | - | < 0,5 |
| Arsenic | 13 | 41 | 6 | 30 | 50 | 250 | 2,7 | - | - | - | - | - | < 5 |
| Bore | - | - | * | * | * | * | 183 | - | - | - | - | - | 151 |
| Cadmium | 3 | 10 | 25 | 5 | 20 | 100 | < 1 | - | - | - | - | - | < 0,9 |
| Calcium | - | - | * | * | * | * | 127 000 | - | - | - | - | - | 103 000 |
| Total Chromium | 210 | 1000 | 50 | 250 | 800 | 4 000 | 44 | - | - | - | - | - | < 45 |
| Cobalt | 34 | 150 | 25 | 50 | 300 | 1 500 | < 10 | - | - | - | - | - | < 15 |
| Copper | 400 | 1000 | 5 | 100 | 500 | 2 500 | 84 | - | - | - | - | - | < 40 |
| Iron | - | - | * | * | * | * | 13 100 | - | - | - | - | - | 7 780 |
| Magnesium | - | - | * | * | * | * | 8 380 | - | - | - | - | - | 5 450 |
| Manganese | - | - | 0,2 | 1000 | 2 200 | 11 000 | 344 | - | - | - | - | - | 242 |
| Mercury | 0,8 | 4 | 50 | 2 | 10 | 50 | 0,41 | - | - | - | - | - | 0,3 |
| Molybdenum | 10 | 20 | 2 | 10 | 40 | 200 | 2,1 | - | - | - | - | - | 3 |
| Nickel | 62 | 180 | 1 | 100 | 500 | 2 500 | 27 | - | - | - | - | - | < 30 |
| Phosphorus | - | - | * | * | * | * | 354 | - | - | - | - | - | < 40 |
| Phosphorus expressed as P2O5 | - | - | * | * | * | * | 812 | - | - | - | - | - | - |
| Potassium | - | - | * | * | * | * | 1 410 | - | - | - | - | - | 1 640 |
| Potassium expressed as K2O | - | - | * | * | * | * | 1 700 | - | - | - | - | - | 2 982 |
| Lead | 12 | 300 | 50 | 500 | 1 000 | 5 000 | 133 | - | - | - | - | - | 97 |
| Selenium | 2 | 14 | 1 | 3 | 10 | 50 | < 0.5 | - | - | - | - | - | < 1 |
| Sodium | - | - | * | * | * | * | 2 390 | - | - | - | - | - | 1 720 |
| Vanadium | - | - | * | * | * | * | - | - | - | - | - | - | 19 |
| Zinc | 700 | 1850 | 140 | 500 | 1500 | 7 500 | 440 | - | - | - | - | - | 709 |
| Polycyclic Aromatic Hydrocarbons (mg/kg) | | | | | | | | | | | | | |
| Acenaphthene | - | - | 0,1 | 10 | 100 | 100 | 1,73 | - | 0,33 | - | 1,79 | - | <0,1 |
| Acenaphthylene | - | - | 0,1 | 10 | 100 | 100 | 0,37 | - | 0,12 | - | 0,23 | - | <0,1 |
| Anthracene | - | - | 0,1 | 10 | 100 | 100 | 5,50 | - | 1,07 | - | 4,25 | - | 0,80 |
| Benzo(a)anthracene | - | - | 0,1 | 1 | 10 | 34 | 6,39 | - | 1,92 | - | 5,69 | - | 1,30 |
| Benzo(a)pyrene | - | - | 0,1 | 1 | 10 | 34 | 3,92 | - | 1,12 | - | 3,30 | - | 0,80 |
| Benzo(b,j,k)fluoranthene | - | - | * | * | * | 136 | 8,03 | - | 2,25 | - | 6,51 | - | 1,50 |
| Benzo(b)fluoranthene | - | - | 0,1 | 1 | 10 | * | 3,83 | - | 1,03 | - | 2,90 | - | 0,70 |
| Benzo(j)fluoranthene | - | - | 0,1 | 1 | 10 | * | 2,25 | - | 0,59 | - | 1,77 | - | 0,40 |
| Benzo(k)fluoranthene | - | - | 0,1 | 1 | 10 | * | 1,95 | - | 0,63 | - | 1,84 | - | 0,40 |
| Benzo(c)phenanthrene | - | - | 0,1 | 1 | 10 | 56 | < 1.00 | - | < 0,30 | - | < 1,00 | - | 0,30 |
| Benzo(g,h,i)perylene | - | - | 0,1 | 1 | 10 | 18 | 2,19 | - | 0,67 | - | 1,70 | - | 0,50 |
| Chloro-2 naphtalene | - | - | * | * | * | 56 | < 0.10 | - | < 0,10 | - | < 0,10 | - | - |
| Chrysene | - | - | 0,1 | 1 | 10 | 34 | 5,84 | - | 1,89 | - | 5,32 | - | 0,90 |
| Dibenzo(a,h)anthracene | - | - | 0,1 | 1 | 10 | 82 | 0,81 | - | 0,27 | - | 0,70 | - | 0,10 |
| Dibenzo(a,i)pyrene | - | - | 0,1 | 1 | 10 | 34 | 0,73 | - | 0,31 | - | 0,23 | - | <0,1 |
| Dibenzo(a,h)pyrene | - | - | 0,1 | 1 | 10 | 34 | 0,12 | - | < 0,10 | - | 0,15 | - | <0,1 |
| Dibenzo(a,l)pyrene | - | - | 0,1 | 1 | 10 | 34 | 0,14 | - | < 0,10 | - | < 0,10 | - | 0,10 |
| Dimethyl-7,12 Benzo(a)anthracene | - | - | 0,1 | 1 | 10 | 34 | < 0.10 | - | < 0,10 | - | < 0,10 | - | <0,1 |
| Fluoranthene | - | - | 0,1 | 10 | 100 | 100 | 13,3 | 3,8 | | - | 11,4 | - | 2,10 |
| Fluorene | - | - | 0,1 | 10 | 100 | 100 | 3,30 | - | 0,55 | - | 2,82 | - | 0,10 |
| Indeno(1,2,3-cd)pyrene | - | - | 0,1 | 1 | 10 | 34 | 2,11 | - | 0,63 | - | 1,66 | - | 0,40 |
| Methyl-3 cholanthrene | - | - | 0,1 | 1 | 10 | 150 | < 0.10 | - | < 0,10 | - | < 0,20 | - | <0,1 |
| Methyl-1 naphtalene | - | - | 0,1 | 1 | 10 | 56 | 0,77 | - | 0,14 | - | 0,62 | - | <0,1 |
| Methyl-2 naphtalene | - | - | 0,1 | 1 | 10 | 56 | 1,26 | - | 0,21 | - | 0,91 | - | <0,1 |
| Dimethyl-1,3 naphtalene | - | - | 0,1 | 1 | 10 | 56 | 0,81 | - | 0,14 | - | 0,50 | - | <0,1 |
| Trimethyl-2,3,5 naphtalene | - | - | 0,1 | 1 | 10 | 56 | 0,20 | - | < 0,10 | - | 0,18 | - | <0,1 |
| Naphtalene | - | - | 0,1 | 5 | 50 | 56 | 3,47 | - | 0,44 | - | 2,47 | - | <0,1 |
| Phenanthrene | - | - | 0,1 | 5 | 50 | 56 | 16,1 | 3,3 | | - | 13,5 | - | 1,30 |
| Pyrene | - | - | 0,1 | 10 | 100 | 100 | 9,83 | - | 2,88 | - | 8,71 | - | 1,70 |
| Petroleum Hydrocarbons (mg/kg) | | | | | | | | | | | | | |
| Petroleum Hydrocarbons (C10 to C50) | - | - | 100 | 700 | 3 500 | 10 000 | 2 480 | 2 560 | 2 210 | 2 130 | 3 560 | - | 4 040 |

-: Not analyzed
*: No criteria or limit values for this parameter were determined by the MELCC.

FIG. 4

|  | Material identification | | | | | | Test 2 - Composting | | | | | | | |
|---|---|---|---|---|---|---|---|---|---|---|---|---|---|---|
|  | Step of the test | | | | | | Start of the test | Sampling before first mixing | | | | Firts mixing | End of test | |
|  | Analysis certificate | | | | | | M1544890 | M1557239 | M1557238 | M1557238 | M1557238 | M1561104 | M1577797 / 19M490132 | 19M494001 |
| Contamination range | <C | | A-B | B-C | >C | ≥ Appendix I of RESC | | | | | | | | |
| Criteria and limite value | Guide MRF | | Guide d'intervention / RPRT | | | RESC | | | | | | | | |
|  | C1 | C2 | A | B / Antesce | C / Annexe II | Appendix I | | | | | | | | |
| Metals and Metalloids (mg/kg) | | | | | | | | | | | | | | |
| Aluminium | * | * | * | * | * | * | - | - | - | - | - | - | 5710 | - | 4080 |
| Antimoine | * | * | * | * | * | * | - | - | - | - | - | - | - | - | < 20 |
| Silver | * | * | 2 | 20 | 40 | 200 | - | - | - | - | - | - | - | - | < 0,5 |
| Arsenic | 13 | 41 | 6 | 30 | 50 | 250 | - | - | - | - | - | - | 2,5 | - | < 5 |
| Bore | * | * | * | * | * | * | - | - | - | - | - | - | 125 | - | 133 |
| Cadmium | 3 | 10 | 25 | 5 | 20 | 100 | - | - | - | - | - | - | < 1,0 | - | < 0,9 |
| Calcium | * | * | * | * | * | * | - | - | - | - | - | - | 125000 | - | 92000 |
| Total Chromium | 210 | 1000 | 50 | 250 | 800 | 4 000 | - | - | - | - | - | - | 24 | - | < 45 |
| Cobalt | 34 | 150 | 25 | 50 | 300 | 1 500 | - | - | - | - | - | - | < 10 | - | < 15 |
| Copper | 400 | 1000 | 5 | 100 | 500 | 2 500 | - | - | - | - | - | - | 31 | - | < 40 |
| Iron | * | * | * | * | * | * | - | - | - | - | - | - | 11400 | - | 9480 |
| Magnesium | * | * | * | * | * | * | - | - | - | - | - | - | 6600 | - | 4470 |
| Manganese | * | * | 0,2 | 1000 | 2 200 | 11 000 | - | - | - | - | - | - | 293 | - | 246 |
| Mercury | 0,8 | 4 | 50 | 2 | 10 | 50 | - | - | - | - | - | - | 0,3 | - | 0,4 |
| Molybdenum | 10 | 20 | 2 | 10 | 40 | 200 | - | - | - | - | - | - | 1,9 | - | < 2 |
| Nickel | 62 | 180 | 1 | 100 | 500 | 2 500 | - | - | - | - | - | - | 13 | - | < 30 |
| Phosphorus | * | * | * | * | * | * | - | - | - | - | - | - | - | - | < 40 |
| Phosphorus expressed as P2O5 | * | * | * | * | * | * | - | - | - | - | - | - | 1570 | - | 0 |
| Potassium | * | * | * | * | * | * | - | - | - | - | - | - | 2250 | - | 1520 |
| Potassium expressed as K2O | * | * | * | * | * | * | - | - | - | - | - | - | 2710 | - | 2 764 |
| Lead | 12 | 300 | 50 | 500 | 1 000 | 5 000 | - | - | - | - | - | - | 73 | - | 54 |
| Selenium | 2 | 14 | 1 | 3 | 10 | 50 | - | - | - | - | - | - | < 0,5 | - | < 1 |
| Sodium | * | * | * | * | * | * | - | - | - | - | - | - | 2040 | - | 1820 |
| Vandadium | * | * | * | * | * | * | - | - | - | - | - | - | - | - | 18 |
| Zinc | 700 | 1850 | 140 | 500 | 1 500 | 7 500 | - | - | - | - | - | - | 481 | - | 387 |
| Polycyclic Aromatic Hydrocarbons (mg/kg) | | | | | | | | | | | | | | |
| Acenaphthene | * | * | 0,1 | 10 | 100 | 100 | 0,28 | - | 0,19 | - | 0,18 | - | - | - | <0,1 |
| Acenaphthylene | * | * | 0,1 | 10 | 100 | 100 | 0,18 | - | < 0,10 | - | 0,18 | - | - | - | <0,1 |
| Anthracene | * | * | 0,1 | 10 | 100 | 100 | 0,74 | - | 0,83 | - | 0,75 | - | - | - | 0,2 |
| Benzo(a)anthracene | * | * | 0,1 | 1 | 10 | 34 | 0,89 | - | 1,56 | - | 1,78 | - | - | - | 0,8 |
| Benzo(a)pyrene | * | * | 0,1 | 1 | 10 | 34 | 0,82 | - | 0,98 | - | 1,06 | - | - | - | 0,5 |
| Benzo(b,j,k)fluoranthene | * | * | * | * | * | 136 | 1,22 | - | 1,79 | - | 2,18 | - | - | - | 0,8 |
| Benzo(b)fluoranthene | * | * | 0,1 | 1 | 10 | * | 0,54 | - | 0,82 | - | 1,00 | - | - | - | 0,4 |
| Benzo(j)fluoranthene | * | * | 0,1 | 1 | 10 | * | 0,35 | - | 0,47 | - | 0,57 | - | - | - | 0,2 |
| Benzo(k)fluoranthene | * | * | 0,1 | 1 | 10 | * | 0,33 | - | 0,50 | - | 0,60 | - | - | - | 0,2 |
| Benzo(c)phenanthrene | * | * | 0,1 | 1 | 10 | 56 | 0,12 | - | < 0,30 | - | < 0,30 | - | - | - | <0,1 |
| Benzo(g,h,i)perylene | * | * | 0,1 | 1 | 10 | 18 | 0,37 | - | 0,49 | - | 0,63 | - | - | - | 0,3 |
| Chloro-2 naphthalene | * | * | * | * | * | 56 | < 0,10 | - | < 0,10 | - | < 0,10 | - | - | - | - |
| Chrysene | * | * | 0,1 | 1 | 10 | 34 | 1,00 | - | 1,49 | - | 1,77 | - | - | - | 0,5 |
| Dibenzo(a,h)anthracene | * | * | 0,1 | 1 | 10 | 82 | 0,11 | - | 0,20 | - | 0,25 | - | - | - | <0,1 |
| Dibenzo(a,i)pyrene | * | * | 0,1 | 1 | 10 | 34 | < 0.10 | - | < 0,10 | - | 0,28 | - | - | - | <0,1 |
| Dibenzo(a,h)pyrene | * | * | 0,1 | 1 | 10 | 34 | < 0.10 | - | < 0,10 | - | < 0,10 | - | - | - | <0,1 |
| Dibenzo(a,l)pyrene | * | * | 0,1 | 1 | 10 | 34 | < 0.10 | - | < 0,10 | - | < 0,10 | - | - | - | <0,1 |
| Dimethyl-7,12 Benzo(a)anthracene | * | * | 0,1 | 1 | 10 | 34 | < 0.10 | - | < 0,10 | - | < 0,10 | - | - | - | <0,1 |
| Fluoranthene | * | * | 0,1 | 10 | 100 | 100 | 1,57 | - | 2,81 | - | 2,98 | - | - | - | 1 |
| Fluorene | * | * | 0,1 | 10 | 100 | 100 | 0,42 | - | 0,41 | - | 0,25 | - | - | - | <0,1 |
| Indeno(1,2,3-cd)pyrene | * | * | 0,1 | 1 | 10 | 34 | 0,33 | - | 0,47 | - | 0,58 | - | - | - | 0,2 |
| Methyl-3 cholanthrene | * | * | 0,1 | 1 | 10 | 150 | < 0.10 | - | < 0,10 | - | < 0,10 | - | - | - | <0,1 |
| Methyl-1 naphthalene | * | * | 0,1 | 1 | 10 | 56 | 0,14 | - | < 0,10 | - | < 0,10 | - | - | - | <0,1 |
| Methyl-2 naphthalene | * | * | 0,1 | 1 | 10 | 56 | 0,17 | - | < 0,10 | - | < 0,10 | - | - | - | <0,1 |
| Dimethyl-1,3 naphthalene | * | * | 0,1 | 1 | 10 | 56 | 0,22 | - | < 0,10 | - | 0,11 | - | - | - | <0,1 |
| Trimethyl-2,3,5 naphthalene | * | * | 0,1 | 1 | 10 | 56 | < 0.10 | - | < 0,10 | - | < 0,10 | - | - | - | <0,1 |
| Naphthalene | * | * | 0,1 | 5 | 50 | 56 | 0,42 | - | 0,13 | - | 0,10 | - | - | - | <0,1 |
| Phenanthrene | * | * | 0,1 | 5 | 50 | 56 | 2,13 | - | 2,47 | - | 1,73 | - | - | - | 0,5 |
| Pyrene | * | * | 0,1 | 10 | 100 | 100 | 1,48 | - | 2,32 | - | 2,54 | - | - | - | 0,8 |
| Petroleum Hydrocarbons (mg/kg) | | | | | | | | | | | | | | |
| Petroleum Hydrocarbons (C10 to C50) | * | * | 100 | 700 | 3 500 | 10 000 | 2 540 | 2 260 | 1 750 | 2 130 | 3 560 | - | - | - | 4640 |

-: Not analyzed  
*: No criteria or limit values for this parameter were determined by the MELCC.

FIG. 5

| | Material identification | | | | | | Fines screen below 5mm | Test 1 - Biotreatment | | | | | |
|---|---|---|---|---|---|---|---|---|---|---|---|---|---|
| | Step of the test | | | | | | Reception of the material | Sampling before first mixing | | | | End of test | |
| | Analysis certificate | | | | | | M1534299 M1548940 | M1557239 | M1557238 | M1557238 | M1557238 | 19M490132 | 19M494001 |
| Contamination range | <C1 | <C2 | >C2 | <A A<B | B-C | >C | ≥ Appendix I of RESC | | | | | | |
| Criteria and limite value | Guide de valorisation des MRF | | Guide d'intervention / RPRT | | | RESC | | | | | | | |
| | C1 | C2 | A | B/ Annexe I | C/ Annexe II | | Appendix I | | | | | | |
| Monocyclic Aromatic Hydrocarbons (mg/kg) | | | | | | | | | | | | | |
| Benzene | * | * | 0,2 | 0,5 | 5 | 5 | < 0.10 | - | - | - | - | - | - |
| Chlorobenzene (monochlorobenzene) | * | * | 0,2 | 1 | 10 | 10 | < 0.10 | - | - | - | - | - | - |
| Dichloro-1,2 benzene | * | * | 0,2 | 1 | 10 | 10 | < 0.15 | - | - | - | - | - | - |
| Dichloro-1,3 benzene | * | * | 0,2 | 1 | 10 | 10 | < 0.10 | - | - | - | - | - | - |
| Dichloro-1,4 benzene | * | * | 0,2 | 1 | 10 | 10 | < 0.20 | - | - | - | - | - | - |
| Ethylbenzene | * | * | 0,2 | 5 | 50 | 50 | 0,88 | - | - | - | - | - | - |
| Styrene | * | * | 0,2 | 5 | 50 | 50 | 0,37 | - | - | - | - | - | - |
| Toluene | * | * | 0,2 | 3 | 30 | 30 | 0,96 | - | - | - | - | - | - |
| Xylenes (total) | * | * | 0,4 | 5 | 50 | 50 | 4,59 | - | - | - | - | - | - |
| Dioxins and furans (D&F) (summation) (pg/kg) | 17 | 50 | * | 15 | 750 | 5 000 | 26 | - | - | - | - | - | - |
| Foreign matter | | | | | | | | | | | | | |
| > 2mm (%) | 0,5 | 1 | 1 | * | * | * | 0 | - | - | - | - | - | 1,68 |
| Sharp foreign bodies (nbr/500ml) | 1 | * | * | * | * | * | 0 | - | - | - | - | - | 5 |
| 12,5mm < Foreign bodies < 25mm et W > 3mm (nbr/500ml) | * | * | * | * | * | * | 0 | - | - | - | - | - | 0 |
| Foreign bodies > 25mm et W > 3mm (nbr/500ml) | 2 | * | * | * | * | * | 0 | - | - | - | - | - | 0 |
| Other parameters | | | | | | | | | | | | | |
| Hydrogen potential | * | * | * | * | * | * | 9,7 | 8,1 | 7,7 | - | - | - | 8,4 |
| Total Kjeldahl nitrogen (mg/kg) | * | * | * | * | * | * | 1 530 | 3 150 | 3 560 | - | - | - | 154 |
| Ammoniacal nitrogen (mg/kg) | * | * | * | * | * | * | - | - | - | - | - | - | 52 |
| Total sulfur (mg/kg) | * | * | * | * | * | * | - | - | - | - | - | - | 72 680 |
| Organic mater by burning at 550C (PNA) (% p/p) | * | * | * | * | * | * | 16 | - | - | - | - | - | 18 |
| Total carbon (PNA) (%) | * | * | * | * | * | * | - | 15,8 | 8,7 | - | - | - | - |
| Ratio C/N | * | * | * | * | * | * | 52 | - | - | - | - | - | - |
| Neutralising power (%CaCO3 p/p sec) | * | * | * | * | * | * | 15 | - | - | - | - | - | 20 |
| E. Coli (UFC/g sec) | s.o. | * | 2000000 | * | * | * | < 22 | - | - | - | - | < 150 | - |
| Salmonella | s.o. | * | s.o. | * | * | * | Absence | - | - | - | - | Absence | - |
| Fecal coliforms (UFC/g sec) | * | * | * | * | * | * | - | - | - | - | - | <150 | - |
| Water content (%w) | * | * | * | * | * | * | 54,7 | 44,4 | 45,2 | 46,6 | 47,2 | - | 36,0 |
| IMV | 1 | 1 | * | * | * | * | 0,756 | - | - | - | - | - | 1,37 |

-: Not analyzed
\*: No criteria or limit values for this parameter were determined by the MELCC.

FIG. 6

|  | Material identification | | | | | | | Test 2 - Composting | | | | | | | |
|---|---|---|---|---|---|---|---|---|---|---|---|---|---|---|---|
|  | Step of the test | | | | | | | Start of the test | Sampling before first mixing | | | | Fitts mixing | End of test | |
|  | Analysis certificate | | | | | | | M1544890 | M1557239 | M1557238 | M1557238 | M1557238 | M1561104 | M1577797 | 19M490132 | 19M494001 |
| Contamination range | <C1 | C1-C2 | >C2 | A-B | B-C | >C | ≥ Appendix I of RESC | | | | | | | | |
| Criteria and limite value | Guide de valorisation des MRF | | Guide d'intervention / RPRT | | | RESC | | | | | | | | | |
|  | C1 | C2 | A | B/ Annexe II | C/ Annexe II | Appendix I | | | | | | | | | |
| Monocyclic Aromatic Hydrocarbons (mg/kg) | | | | | | | | | | | | | | | |
| Benzene | * | * | 0,2 | 0,5 | 5 | 5 | - | - | - | - | - | - | - | - | - |
| Chlorobenzene (monochlorobenzene) | * | * | 0,2 | 1 | 10 | 10 | - | - | - | - | - | - | - | - | - |
| Dichloro-1,2 benzene | * | * | 0,2 | 1 | 10 | 10 | - | - | - | - | - | - | - | - | - |
| Dichloro-1,3 benzene | * | * | 0,2 | 1 | 10 | 10 | - | - | - | - | - | - | - | - | - |
| Dichloro-1,4 benzene | * | * | 0,2 | 1 | 10 | 10 | - | - | - | - | - | - | - | - | - |
| Ethylbenzene | * | * | 0,2 | 5 | 50 | 50 | - | - | - | - | - | - | - | - | - |
| Styrene | * | * | 0,2 | 5 | 50 | 50 | - | - | - | - | - | - | - | - | - |
| Toluene | * | * | 0,2 | 3 | 30 | 30 | - | - | - | - | - | - | - | - | - |
| Xylenes (total) | * | * | 0,4 | 5 | 50 | 50 | - | - | - | - | - | - | - | - | - |
| Dioxins and furans (D&F) (summation) (pg/kg) | 17 | 50 | * | 15 | 750 | 5 000 | - | - | - | - | - | - | - | - | - |
| Foreign bodies | | | | | | | | | | | | | | | |
| > 2mm (%) | 0,5 | 1 | 1 | * | * | * | - | - | - | - | - | - | 0,48 | - | - |
| Sharp foreign bodies (nbr/500ml) | 1 | * | * | * | * | * | - | - | - | - | - | - | 2 | - | - |
| 12,5mm < Foreign bodies < 25mm et W > 3mm (nbr/500ml) | * | * | * | * | * | * | - | - | - | - | - | - | 1 | - | - |
| Foreign bodies > 25mm et W > 3mm (nbr/500ml) | 2 | * | * | * | * | * | - | - | - | - | - | - | 0 | - | - |
| Autres paramètres | | | | | | | | | | | | | | | |
| Hydrogen potential | * | * | * | * | * | * | - | 8,3 | 8,0 | - | - | - | 7,8 | - | 7,8 |
| Total Kjeldahl nitrogen (mg/kg) | * | * | * | * | * | * | 3 560 | 3 300 | 4 120 | - | - | - | 3370 | - | 600 |
| Ammoniacal nitrogen (mg/kg) | * | * | * | * | * | * | - | - | - | - | - | - | < 40 | - | 13 |
| Nitrite + Nitrate (mg/kg) | * | * | * | * | * | * | - | - | - | - | - | - | 489 | - | - |
| Water soluble magnesium (mg/kg) | * | * | * | * | * | * | - | - | - | - | - | - | 660 | - | - |
| Total sulfur (mg/kg) | * | * | * | * | * | * | - | - | - | - | - | - | 41600 | - | 58320 |
| Organic mater by burning at 550C (PNA) (% p/p) | * | * | * | * | * | * | 26 | - | - | - | - | - | 21 | - | 22,3 |
| Total carbon (PNA) (%) | * | * | * | * | * | * | - | 12,1 | 11,6 | - | - | - | 13,4 | - | - |
| Inorganic Carbon (%) | | | * | * | * | * | - | - | - | - | - | - | < 0,1 | - | - |
| Ratio C/N | * | * | * | * | * | * | - | - | - | - | - | - | 31 | - | - |
| Neutralising power (%CaCO3 p/p sec) | * | * | * | * | * | * | - | - | - | - | - | - | 17,4 | - | 19,6 |
| Respiration rate mg O2/kg s.v.-h | * | * | 400 | * | * | * | - | - | - | - | - | - | 216 | - | - |
| Respiration rate mg O2/kg s.t.-h | * | * | 400 | * | * | * | - | - | - | - | - | - | 45,3 | - | - |
| E. Coli (UFC/g sec) | s.o. | * | 2000000 | * | * | * | - | - | - | - | - | - | >1100000 | - | < 170 | - |
| Salmonella | s.o. | * | s.o. | * | * | * | - | - | - | - | - | - | - | Absence | - |
| Fecal coliforms (UFC/g sec) | * | * | * | * | * | * | - | - | - | - | - | - | >1100000 | - | < 170 | - |
| total matter (PNA) (mg/kg) | * | * | * | * | * | * | - | - | - | - | - | - | 600000 | - | - |
| Total volatil matter (PNA) (mg/kg) | * | * | * | * | * | * | - | - | - | - | - | - | 128000 | - | - |
| Total fix matter (PNA) (mg/kg) | * | * | * | * | * | * | - | - | - | - | - | - | 472000 | - | - |
| Water content (%w) | * | * | * | * | * | * | 47,3 | 39,2 | 46,3 | 50,3 | 41,9 | - | 47,7 | - | 37,6 |
| IMV | 1 | 1 | * | * | * | * | - | - | - | - | - | - | 1,3 | - | 1,52 |

-: Not analyzed
*: No criteria or limit values for this parameter were determined by the MELCC.

FIG. 7

End of test 1 - Biotreatment

| Material identification | | | | | | | | | | | | |
|---|---|---|---|---|---|---|---|---|---|---|---|---|
| | | | Sample identification | Fine-26G3019-1 | Essai 1-140716 | Essai 1-A 190901 | Essai 1-A 190901 Reprise 1 | Essai 1-A 190901 Reprise 2 | Essai 1-B 190901 | Essai 1-B 190901 Reprise 1 | Essai 1-B 190901 Reprise 2 | Final results arithmetic mean (mg/kg) | Percentage of degradation (%) |
| Contamination range | ≤ A | A-B¹ | B-C | ≥ C | ≥ appendix II du RESC | | | | | | | | |
| Criteria and limit value | Guide d'intervention / RPRT | | | | RESC | | | | | | | | |
| | A | B / Appendix I | C / Appendix II | ≥ Appendix II | | | | | | | | | |
| Petroleum hydrocarbons | | | | | | | | | | | | | |
| Petroleum hydrocarbons (C10 à C50) | 100 | 700 | 3 500 | 10 000 | 2 480 | 4 040 | 1 440 | 987 | 1 080 | 1 190 | 1 890 | 1 200 | 2 190 | 2 150 | 1 796 | 28 |
| Summation of PAH | * | * | * | * | 95 | 13 | - | - | - | - | - | - | - | - | 86 |
| Summation of MAH | * | * | * | * | 7 | n.d. | - | - | - | - | - | - | - | - | 100 |

End of test 2 - Composting

| Material identification | | | | | | | | | | | | |
|---|---|---|---|---|---|---|---|---|---|---|---|---|
| | | | Sample identification | Fine-26G3019-1 | Essai 2-140716 | Essai 2-A 190901 | Essai 2-A 190901 Reprise 1 | Essai 2-A 190901 Reprise 2 | Essai 2-B 190901 | Essai 2-B 190901 Reprise 1 | Essai 2-B 190901 Reprise 2 | Final results arithmetic mean (mg/kg) | Percentage of degradation (%) |
| Contamination range | ≤ A | A-B¹ | B-C | ≥ C | ≥ appendix II du RESC | | | | | | | | |
| Criteria and limit value | Guide d'intervention / RPRT | | | | RESC | | | | | | | | |
| | A | B / Appendix I | C / Appendix II | ≥ Appendix II | | | | | | | | | |
| Petroleum hydrocarbons | | | | | | | | | | | | | |
| Petroleum hydrocarbons (C10 à C50) | 100 | 700 | 3 500 | 10 000 | 2 480 | 4 640 | 813 | 1 660 | 1 550 | 774 | 821 | 856 | 1 860 | 795 | 1 530 | 38 |
| Summation of PAH | * | * | * | * | 95 | 6 | - | - | - | - | - | - | - | - | 93 |
| Summation of MAH | * | * | * | * | 7 | n.d. | - | - | - | - | - | - | - | - | 100 |

-: Not analyzed
*: No criteria or limit values for this parameter were determined by the MELCC.

FIG. 8

CONDITIONING, BIOTREATMENT AND COMPOSTING OF CONSTRUCTION AND DEMOLITION DEBRIS FINES

CROSS REFERENCE TO RELATED APPLICATIONS

This application claims benefit of U.S. provisional application Ser. No. 62/890,120 filed on Aug. 22, 2019. All documents above are incorporated herein in their entirety by reference.

FIELD OF THE INVENTION

The present invention relates to valuation fines residues of heterogeneous particle sizes and chemical compositions. More specifically, the present invention is concerned with a method for conditioning, biotreatment and composting of fines residues of heterogeneous particle sizes and chemical compositions.

BACKGROUND OF THE INVENTION

The construction and demolition (C&D) sector generates a large amount of residual materials. The building sector typically generates surpluses or scrap of materials used at the time of construction, such as wood, gypsum, plastic, and metal for example, mixed materials resulting from renovation or demolition, such as aggregates, asphalt shingles, wood and gypsum for example, and from packaging, including cardboard and plastic for example.

These residual materials are sent to dedicated residue facilities for sorting and recycling or segregation in varying proportions depending on the facility and the season. The humidity of the materials received at these facilities varies according to the seasons, the materials being more humid in spring and fall when in northern America latitudes for example. Materials received in these facilities include gypsum, wood, insulating materials, aggregates, brick, cardboard, mineral wool, concrete, porcelain, parquet and low concentrations of plastic, metal and other demolition debris and construction scrap and packaging. Moreover, although asphalt shingles are sometimes removed prior to demolition and thus do not end up to C&D recycling facilities mixed together with other residual materials, asphalt shingles still occur in residual materials processed in C&D recycling.

Typically, after reception, the materials are discharged in piles, either outdoors or indoors according to the facilities, and undergo several steps of manual and/or mechanical sorting, with optical readers for example. Some facility may be equipped with a density separator and/or a magnetic separator for steel and eddy current for nonferrous metals.

Screening is used to separate material having smaller particle size, which valuation is typically difficult. The facilities thus produce fine residues, which composition essentially depends on the proportion of each type of material each facility processes. For example, if important quantities of gypsum wall debris are processed at a given facility, the resulting fine residues contain larger amounts of gypsum. As mentioned hereinabove, although some facilities may segregate asphalt shingles at the source or sort them in situ, shingles may be found in the fine residual materials. Again, depending on the facility, the fine residues vary in particle size and chemical composition.

Thus, the fines generated by recycling facilities have varying composition and granulometry. Fines typically comprise soil and fine aggregates with amounts of wood, gypsum and asphalt products. Their use as alternative daily cover material at landfill sites is compromised due to the presence of gypsum, from drywall, and of sulfur in gypsum, which may cause the production of hydrogen sulfide ($H_2S$) gas when buried in anaerobic conditions with putrescible materials of the landfills. It has thus become difficult to dispose of them at reasonable costs.

There is a still need for a method and a system for construction and demolition debris fines valuation.

BRIEF DESCRIPTION OF THE DRAWINGS

In the appended drawings:

FIG. 4 shows analytical results of fines materials before, during, and after a method according to an embodiment of an aspect of the present disclosure;

FIG. 5 shows analytical results of fines materials before, during, and after a method according to an embodiment of an aspect of the present disclosure;

FIG. 6 shows analytical results of the fines materials of FIG. 4, before, during, and after the method;

FIG. 7 shows analytical results of the fines materials of FIG. 5, before, during, and after the method.

SUMMARY OF THE INVENTION

More specifically, in accordance with the present invention, there is provided a method for processing raw fines materials, comprising: screening the raw fines materials to Grade 1 comprising fines materials of a size of at most about 5 mm and Grade 2 comprising fines materials of a size larger than about 5 mm; and at least one of: A) bio-oxydating organic contaminants of the Grade 1; wherein the A) bio-oxydating organic contaminants of the Grade 1 comprises: adding and mixing organic amendment and maintaining a temperature of about 35° C., a water content in a range between about 10 and about 20% v/v and a carbon/nitrogen ratio of about 20, in aerobic conditions; and monitoring a content of organic contaminants until the content of organic contaminants stops decreasing; B) composting the Grade 1; wherein the B) composting the Grade 1 comprises: a pasteurization step, the pasteurization step comprising: adding and mixing organic amendment, in aerobic conditions until reaching a temperature in a range between about 50 and about 70° C.; maintaining a water content in a range between about 50 about 60% v/v, maintaining a carbon/nitrogen ratio of at least about 20; and monitoring pathogens content and respiration rate; and stopping the addition of organic amendment upon detection of absence of pathogens at a predetermined respiration rate, thereby initiating a stabilization step; C) processing the Grade 1 into filler for resin composites, wherein the C) processing the Grade 1 comprises, providing target filler properties requirement of a resin composite, selecting a combination of a resin and a Grade 1 of chemical affinity with the resin, selecting a ratio between the Grade 1 as a filler and the resin; and mixing the Grade 1 with the resin composite at the selected ratio; D) separating the Grade 2 into a light stream and a heavy stream based on at least one of a composition and a weight; and E) processing the Grade 2 into filler for resin composites; wherein the E) processing the Grade 2 comprises separating the Grade 2 into alight stream and a heavy stream based on at least one of a composition and a weight; and, providing target filler properties requirement of a resin composite, processing the heavy stream to at least one of: decrease particles sizes, and ii) reduce a mean particle size, according to the target filler properties requirement; selecting a ratio between the Grade 3 as a filler and the resin; and mixing the Grade 3 with the resin composite at the selected ratio.

There is further provided a method for processing raw fines materials into fillers for resin composites, comprising, providing target filler properties requirement of a resin composite, screening raw fines materials to Grade 1 comprising fines materials of a size of at most 5 mm; selecting a resin, controlling a water content of the Grade 1 for chemical affinity with the resin, selecting a ratio between the Grade 1 as a filler and the resin; and mixing the Grade 1 with the resin at the selected ratio There is further provided a method for removing foreign matter content from raw fines materials, comprising measuring a water content of the raw fines materials, controlling the water content to a maximum of about 70% v/v; selecting a geometry for a screen depending on the measured water content, and screening the raw fined particules under 5 mm.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

In a nutshell, there is described a method for valuation of raw fines materials, of heterogeneous particle sizes and chemical compositions, such as produced by residue facilities from residual materials as generated by the construction and demolition (C&D) sector for example.

Raw fines materials are typically most heterogeneous in chemical compositions and particle sizes. They may comprise a content of foreign matter, referring to matter larger than 2 mm in size, and which may comprise sharp particulate matter such as for example shards of glass or metal etc. . . . for example, of up to about 20%, either originating from construction and/or demolition sites or from a previous mechanical breaking of larger particulate matter. They may also comprise petroleum hydrocarbons (PH), polycyclic aromatic hydrocarbons (PAH) and monocyclic aromatic hydrocarbons (MAH) originating from multiple sources, including for example asphalt shingles or accidental contamination.

In the present disclosure, Grade 1 fines materials refer to raw fines materials screened to less than 5 mm (more or less 2 mm); Grade 2 fines materials refer to raw fines materials screened to 5 mm (more or less 2 mm).

In the present disclosure, chromatographic analyzes are used to measure the quantity of bioavailable hydrocarbons ($C_{10}$-$C_{30}$) in the materials. Other analysis methods may be used.

In valuation experiments of fines materials, Grade 1 fines materials were used as fillers in composites with thermosetting resins and with foaming/liquid resins as standardly used in in the manufacturing of insulation boards and laminates for example, acrylate, urea formaldehyde and unsaturated polyester resins were selected based on their regular use in manufacturing processes for various laminates, compatibility with the raw fines materials in terms of chemical affinity with the resin, processability, and cost/performance ratio. The resins were thus selected based on the susceptibility of the resin crosslinking reaction tin relation to the water content of the fines materials; for example, some crosslinking reactions may be inhibited by humidity content larger than 5 to 10% v/v. First composites comprising thermosetting resins and Grade 1 fines materials at a ratio between about 60 and about 65% v/v were prepared and formed into laminate panels. The Grade 1 fines materials were selected for chemical affinity with the selected thermosetting resins: in the combinations of the presently described experiments they had a water content of about 8% v/v. The laminate panels were then submitted to a number of standard laminate panels tests. The tested laminate panels met self-extinguishing characteristics as per UL94HB norm; traction rupture charge in a range between about 2.2 and about 6 MPa and flexion rupture charge in a range between about 12.5 and about 24.2 MPa were measured. Second composites comprising between 0 and about 50% v/v Grade 1 fines materials and foaming resin were prepared and shaped into foaming resin panels. The density of the foaming resin panels was found to increase from about 36 to about 104 kg/m their compression resistance to increase from about 8.55 to about 13.67 MPa, and their thermal isolation resistance to increase from about 1.9 to about 1.7 $m^2KW^{-1}$ with increasing amount of the Grade 1 fines material within the composites.

It was shown that Grade 1 fines materials provide inert fillers in thermosetting resins or foaming/liquid resins, such as urethane grade resins. Used as fillers in the composites, they do not alter the rheology of the resins or foams or the processability of the composites: the resulting composites were shaped into panels and laminates using standard processing methods and tools.

Thus, a method according to an embodiment of an aspect of the present disclosure comprises, providing target filler properties requirement of a resin composite, selecting a combination of a resin and a Grade 1 of chemical affinity with the resin, selecting a ratio between the Grade 1 as a filler and the resin; and mixing the Grade 1 with the resin composite at the selected ratio.

Moreover, the Grade 1 fines materials may be pre-conditioned, for example by crushing to decrease the particles size for optimizing their granulometry, and/or by crushing and screening, to 100 to 300 mesh for example, to reduce the mean particle size and their granulometric homogeneity, according to target filler properties requirement of specific applications, such as isolation panels, laminates, structural panels or waterproof membranes for example according to specific processing methods. A range of composites may thus be produced by selecting the resins, selecting and/or pre-conditioning the Grade 1 fines materials filler, and/or the ratio between resin and fines materials filler in the composites. Thus, providing target filler properties requirement of a resin composite, the Grade 1 may be processed to at least one of: decrease a particles size for optimizing granulometry, and ii) crushing and screening to reduce a mean particle size and granulometric homogeneity according to the target filler properties requirement; for incorporation as a filler in the resin composite for target applications, such as isolation panels, laminates, structural panels or waterproof membranes for example.

Grade 1 fines materials thus provide inert, cost-effective fillers in applications such as the manufacture of insulation boards and laminates for example.

In other valuation experiments, noise abatement berms were constructed with unscreened, raw CRD fines materials from sorting facilities. Preliminary results indicated hydrogen sulfide production in the berms, due mainly to Grade 1 content of this raw fines materials, typically most reactive and with high gypsum content. In contrast, Grade 2 content of the raw fines materials, with a coarser granulometry, allows maintaining an aerobic environment in the berms thus inhibiting the formation of hydrogen sulfide.

In other valuation experiments, first raw fines materials having a water content of about 55% by weight were screened using square openings of 5 mm, for example with heavy duty Terex™ Finlay 863 screen. The contents of foreign matter (material of particle size greater than 2 mm), petroleum hydrocarbons (PH) and polycyclic aromatic hydrocarbons (PAH) were measured in the screened fines materials and compared to the values of the unscreened raw fines materials. The PH and PAH content remained mainly unchanged. The foreign matter content was reduced in the screened fines materials from about 20% by weight to less than 1% by weight. Second raw fines materials having a water content of about 50% by weight were screened using 4 mm by 19 mm rectangular slots, for example with a Bivitec™ screen. There were no clogging during the tests. The reduction of content of foreign matter, from about 20% in the raw fines materials to less than 0.5% v/v was improved compared to with using square openings as discussed hereinabove. However, the Grade 2 material obtained comprised a larger number of fines particles of a size below 5 mm, due to smaller particles sticking to coarser ones in wetter materials and thus clogging of the screen. A method according to an embodiment of an aspect of the present disclosure comprises determining the water content of the raw fines materials, adjusting the water below a maximum in a range between about 60 and 70% v/v; selecting a geometry for a screen depending on the determined water content, and on target applications, such as: obtaining Grade 1 and/or Grade 2 qualifying as residual fertilizing materials (RFM), with a foreign matter content of at most 1%. The rheology of fines with a water content of more than about 70% is found difficult to screen efficiently.

Figure 1A:
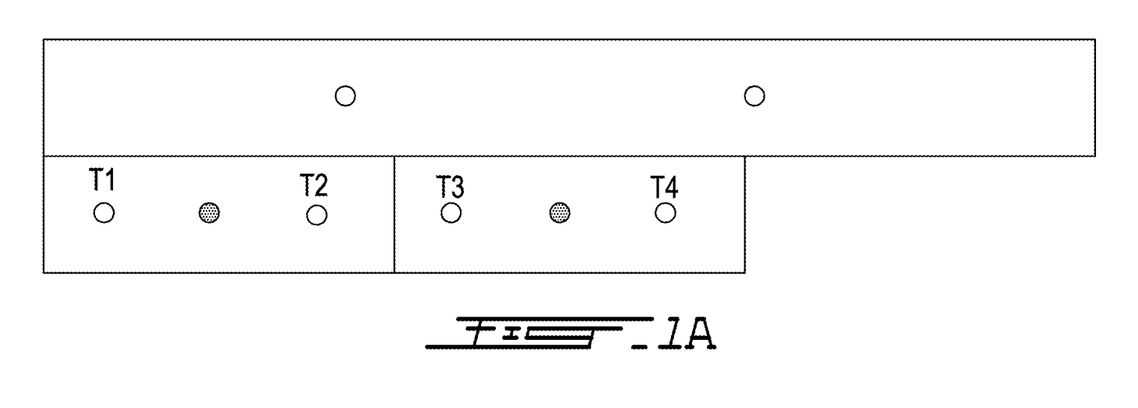
FIG. 1A is a schematic view of a system according to an embodiment of an aspect of the present disclosure.
Figure 1B:
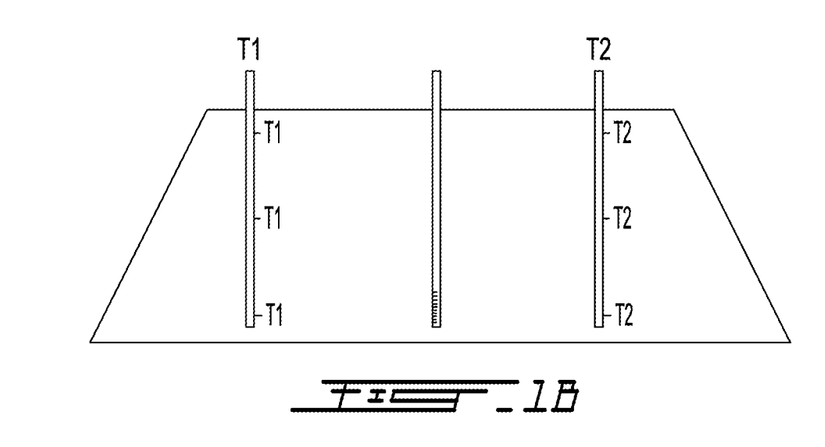
FIG. 1B is a close up view of the left hand side of FIG. 1A.

In other valuation experiments, raw fines materials were screened as described hereinabove to obtain Grade 1 fines materials. Then, organic amendment was added to a pile of the Grade 1 fines materials in controlled amounts to produce heat and rise the temperature within the pile to about 35° C., under ventilation to maintain aerobic conditions, and under nitrogen and carbon content monitoring and control of nutrients feeding to microorganisms within the pile. Interstitial air content ($O_2$, $CO_2$, $CH_4$, $H_2S$) was monitored through wells W, and the temperature at different depths within the pile was measured using thermocouples T1-T2 selectively positioned in the center and at about equal distances from the center of the pile in order to collect temperature data throughout the pile (see left hand side of FIG. 1A, and FIG. 1B).

Stirring of the pile, using a standard mechanical excavator such as a Komatsu PC200-LC for example, is done to homogenize the temperature in case of temperature drop detection. After each addition of horse manure and wood chips as organic amendment, the carbon/nitrogen ratio within the pile is measured, and a nitrogen-rich fertilizer is selectively added to the pile to maintain the carbon/nitrogen ratio to about 20. Moisture is monitored so as to maintain a water content in a range between about 10 and about 20% v/v Experiment parameters are shown in Table I below:

TABLE I

| fines below 5 mm | 80 m³ |
| horse manure + wood chips | 8 m³ |
| pile size | 9 m × 3 m × 3 m |
| water content of fines | 10-20% v/v |
| fertilizer | added to adjust C/N ratio to 20 |

The concentration of petroleum hydrocarbons ($C_{10}$-$C_{50}$) is monitored, and a maximum degradation of bioavailable ($C_{10}$-$C_{30}$) petroleum hydrocarbons is detected when the concentration of bioavailable ($C_{10}$-$C_{30}$) petroleum hydrocarbons stops decreasing. The fines materials from the pile is then sampled and analyzed for assessing against target environmental parameters.

FIG. 4 shows analytical results of the fines materials for PH ($C_{10}$-$C_{50}$), PAH, and other contaminants such as metals and metalloids, before, during, and after the test, while FIG. 6 shows analytical results of the fines materials for monocyclic aromatic hydrocarbons (MAH), dioxins and furans, foreign matter and pathogens, before, during, and after the test. As shown by the chemical analysis results, after the test, the obtained material meets environmental parameters of residual fertilizing materials (RFM), as a result of the screening (see FIG. 6). Moreover, bioavailable petroleum hydrocarbons (PH) and polycyclic aromatic hydrocarbons (PAH) were efficiently biodegraded (FIG. 4).

In other valuation experiments, organic amendment was added to and mixed with a pile of Grade 1 fines materials obtained by screening as described hereinabove, under ventilation to maintain aerobic conditions (see right hand side of FIG. 1A); interstitial air contents ($O_2$, $CO_2$, $CH_4$, $H_2S$) were monitored though slotted wells within the pile, and the temperature at different depths and locations within the pile was measured using selectively positioned thermocouples T3, T4 as described hereinabove in relation to the biotreatment test. Experiment parameters are shown in Table II below:

TABLE II

| fines below 5 mm | 40 m³ |
| horse manure + wood chips | 40 m³ |
| pile size | 9 m × 3 m × 3 m |
| water content of fines | 50-60% v/v |
| fertilizer | added to adjust C/N ratio to 30 |

A pasteurization phase initiated by raising the temperature of the piled material to a range between about 50 and about 70° C., for example by adding organic matter in the form of horse manure and wood chips and stirring to homogenize the temperature in case of detection of a temperature gradient between the center and the surface of the pile. Moisture is monitored so as to maintain a water content in a range between about 50 about 60% v/v. Nitrogen and carbon are monitored, and a nitrogen-rich fertilizer is selectively added to maintain the mixture in excess of organic matter by maintaining the carbon/nitrogen at a ratio above 20, for example of about 30. The pasteurization phase is maintained until elimination of micro-organisms and prevention of the proliferation of remaining micro-organisms, as determined based on pathogens such as *Salmonella*, and respiration rate (mg $O_2$/h/kg organic matter) monitoring. The respiration rate measures the rate at which microorganisms consume oxygen as they process organic waste: a faster rate of oxygen consumption indicates the presence of easily biodegradable organic waste, and then the rate of oxygen consumption declines as less biodegradable matter is being processed. In the presently described conditions, after a period of time of two weeks with temperatures maintained above 50° C., the pasteurization phase was over as measured by absence of pathogens and *salmonella* and respiration rates below 400 $mgO_2$/h/kg.

Biodegradation of bioavailable HP is achieved during the pasteurization phase.

A stabilization phase is then initiated by stopping the addition of fresh organic amendment, thereby allowing the temperature within the pile to decrease down to the ambient temperature and the nitrogen and carbon contents to stabilize.

FIG. 5 shows analytical results for PH ($C_{10}$-$C_{50}$), PAH, and other contaminants such as metals and metalloids, of the fines materials before, during, and after the test. FIG. 7 shows analytical results of the fines materials for MAH, dioxins and furans, foreign matter and pathogens, of the fines materials before, during, and after the test.

As shown by the chemical analysis results, after the test, the obtained material meets environmental parameters of residual fertilizing materials (RFM) as a result of the screening (see FIG. 7). Moreover, bioavailable petroleum hydrocarbons (PH) and polycyclic aromatic hydrocarbons (PAH) are efficiently biodegradated (FIG. 5). Moreover, the resulting material sampled for chemical analysis tested as an immature compost. Most heterogenous materials such as CRD fines materials are thus effectively processed into immature compost, ready for maturation and tailorable depending on target applications (see FIGS. 5 and 7).

As described hereinabove, gases are drawn from the piles, and tested for volatile organic compounds (VOC). In case of detection of volatile organic compounds (VOC), air is diverted from the piles for treatment. Otherwise, the airflow of these heated gases produced by the piles may be recirculated within the piles, thereby used for maintaining the temperature within the piles. In the above-described experiments for example, the temperature and $CO_2$/$O_2$/$CH_4$/$H_2S$ of the air within the piles content were measured 3 times a week.

In the HP and PAH degradation method, starting from the parameters of the fines materials to be treated, including HP, HAP, Kjeldahl nitrogen and total organic matter (MOT), the method comprises monitoring and controlling the total organic matter (MOT), Kjeldahl nitrogen (NTK), and humidity, by measurement after each addition of organic amendment, and monitoring the PAH and HP contents. The PAH and HP contents degradation method may be stopped based on HP chromatograms and PAH content.

In the presently described experiments, PAH and HP were monitored based on the initial composition of the fines materials of the piles, and on HP chromatograms and HAP content.

Figure 8:
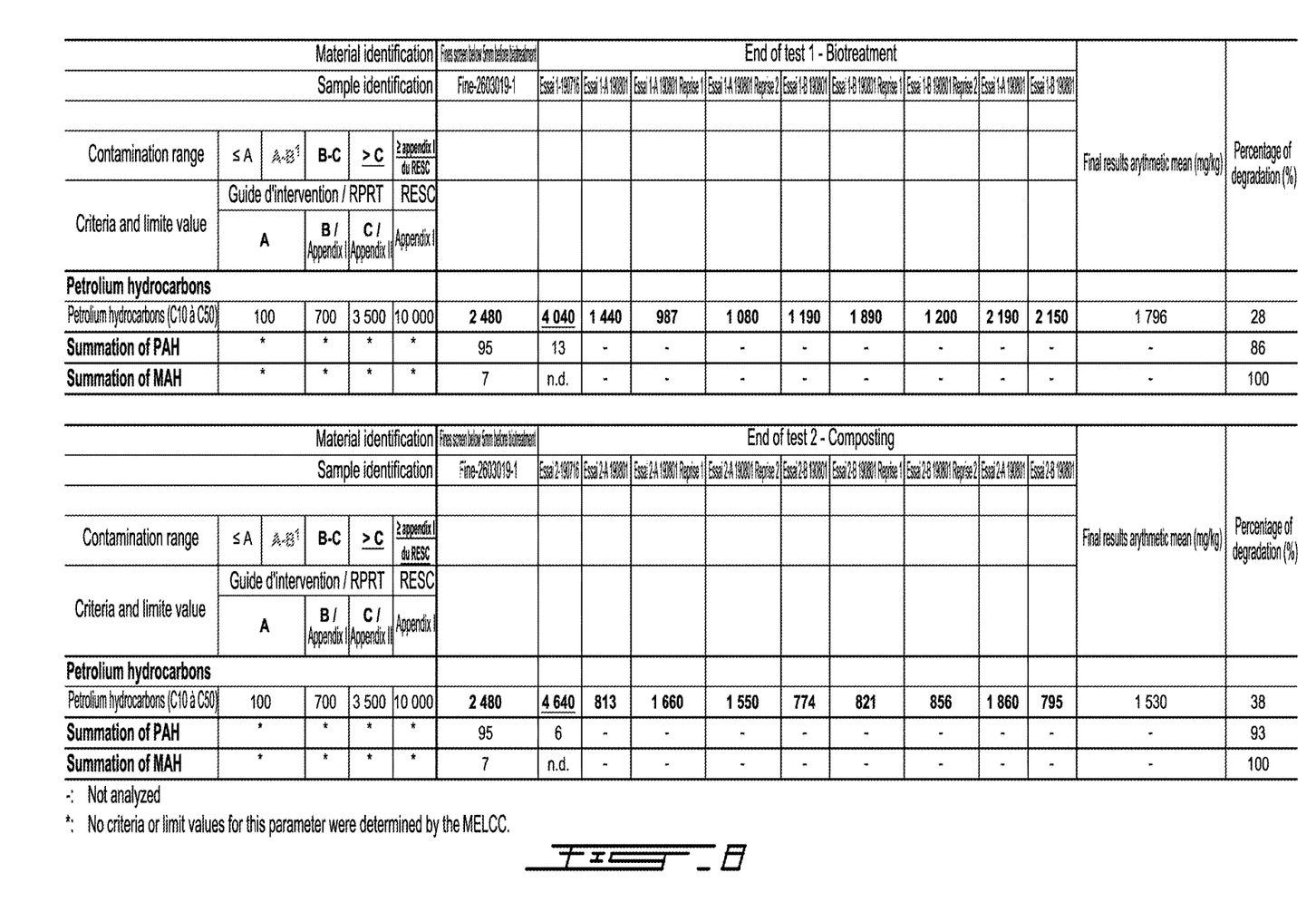
FIG. 8 shows analytical results and analysis of the percentage of degradation for polycyclic aromatic hydrocarbons (PAH), petroleum hydrocarbons ($C_{10\text{-}50}$) and monocyclic aromatic hydrocarbons (MAH) in the fines materials of FIGS. 4-7.

FIG. 8 shows analytical results and analysis of the percentage of degradation for PAH, PH ($C_{10-50}$) and MAH, in the biodegradation experiments and in the composting experiments. Results show degradation of at least 86% for the PAH, about 28% for the PH ($C_{10-50}$) and 100% for the MAH. There is thus provided a method for decontaminating raw fines materials from bioavailable petroleum hydrocarbons (PH), polycyclic aromatic hydrocarbons (PAH) and monocyclic aromatic hydrocarbons (MAH).

As can be seen from chemical analysis results presented in FIGS. 4-8, the present screening method processes raw fines materials into materials having a content of material larger than 2 mm in size, referred to hereinafter as foreign matter content, of at most 1%, thus qualifying as residual fertilizing materials (RFM).

The composting method allows an effective pasteurization phase, as evidenced by the tracking of the temperature and of the air quality within the material. The absence of hydrogen sulfide is shown in both the biotreatment method and in the composting method.

In the presently described experiments trace-pathogen-olfactory-foreign body element content, leachate hazardous residual material content, analysis of leaching with water, and Asbestos measurements were performed to further assess and control the materials resulting from biotreatment or composting, in order to optimize possible applications for these obtained materials.

Figure 2:
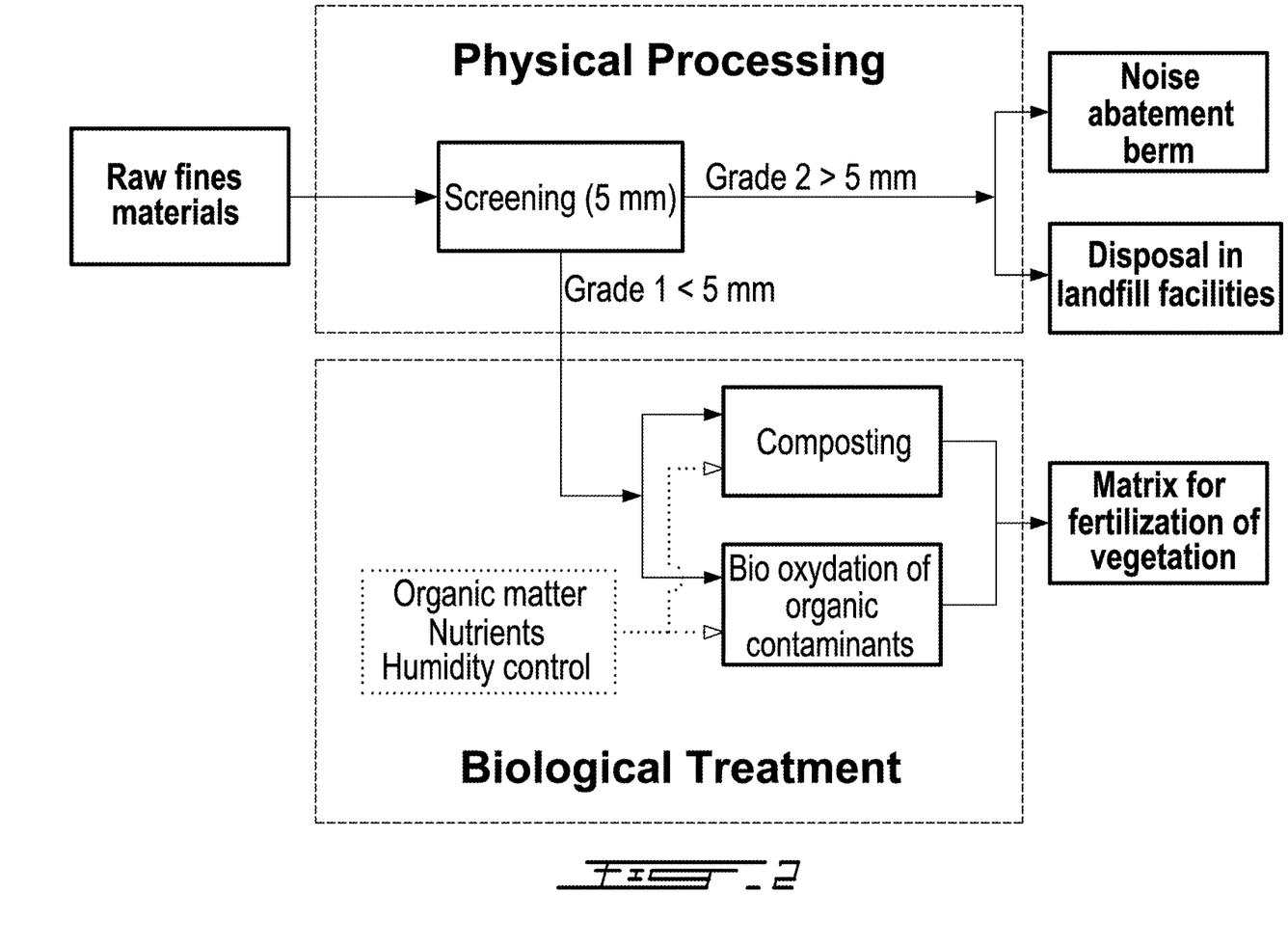
FIG. 2 is a flowchart of a method according to an embodiment of an aspect of the present disclosure.

A method according to an embodiment of an aspect of the present disclosure as illustrated in FIG. 2, comprises screening raw fines material into Grade 1 (less than 5 mm more or less 2 mm) part, and Grade 2 (material of 5 mm more or less 2 mm) as described hereinabove. Grade 2 may be used for application such as noise abatement berms for example. Grade 1 may be treated for organic contaminants such as HP and HAP or composted as described hereinabove, for applications as fertilizer.

Figure 3:
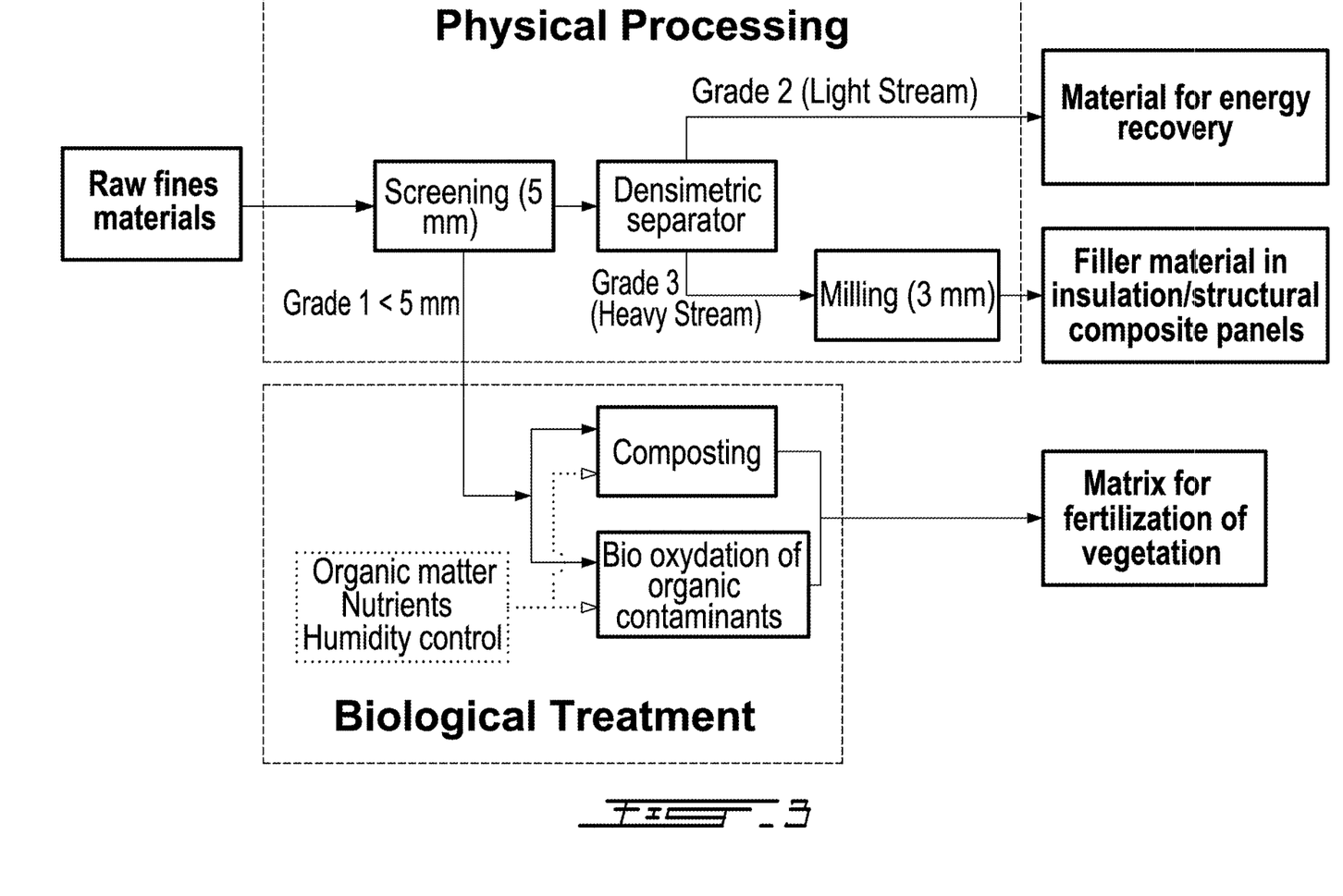
FIG. 3 is a flowchart of a method according to an embodiment of an aspect of the present disclosure.

A method according to an embodiment of an aspect of the present disclosure as illustrated in FIG. 3, comprises screening raw fines material into Grade 1 (less than 5 mm more or less 2 mm) part, and Grade 2-3 part (material of 5 mm more or less 2 mm) as described hereinabove.

Grade 2 is then separated from a Grade 3 based on the nature and/or weight of the particules; the Grade 2 material obtained may comprise wood, paper and plastic for example (Light Stream in FIG. 3). The Grade 2 light stream may then be sent to energy recovery plants; for example.

The Grade 3 content comprises coarser and heavy particles, such as aggregates, glass, large pieces of gypsum, and asphalt shingles, for example (Heavy Stream in FIG. 3). The Grade 3 content may be processed by milling or crushing to reduce the diameter of the particles down to 3 mm more or less, for use as filler materials in composites, as described hereinabove in relation to Grade 1 fines materials for manufacturing of insulation or structural composite panels for example. Thus, providing target filler properties requirement of a resin composite, the heavy stream may be processed to at least one of: decrease a particles size for optimizing granulometry, and ii) crushing and screening to reduce a mean particle size and granulometric homogeneity according to the target filler properties requirement; for incorporation as a filler in the resin composite for target applications, such as insulation or structural composite panels for example.**

Grades 2 and 3 may be separated using a densimetric separator for example. A Grade 2-3 material screened from raw fines materials with the 4 mm by 19 mm rectangular slots discussed hereinabove was used to test densimetric separation. It was found that selecting and adjusting the densimetric separation parameters, including input speed, airflow and separating table positioning, fines materials of having a water content in a range between about 30 and about 50 were separated with less than about 5% of heavy material in the light portion (see FIG. 3). The Heavy Stream obtained (Grade 3), which may typically comprise mineral particles, can be used as fillers in applications such as the manufacture of insulation boards and laminates as described hereinabove.

There is provided a method comprises selecting a geometry for a screen depending on the water content of the raw fines material. for processing the raw fines materials into residual fertilizing materials (RFM).

There is provided a method for HP and HAP degradation, comprising bioxydating HP and HAP from fines materials by controlling enzymatic activities of micro-organisms to transform, degrade, fix or immobilize bioavailable HP, HAP and MAP in different environments including water, soil, and waste for instance.

There is provided a method for processing raw fines materials into composts and natural fertilizer.

There is provided a method for processing raw fines materials into fillers for resin composites.

The scope of the claims should not be limited by the embodiments set forth in the examples, but should be given the broadest interpretation consistent with the description as a whole.

The invention claimed is:

1. A method for processing raw fines materials, comprising:
   screening the raw fines materials to Grade 1 comprising fines materials of a size of at most about 5 mm and Grade 2 comprising fines materials of a size larger than about 5 mm; and one of:
   A) bio-oxydating organic contaminants of the Grade 1;
   wherein said A) bio-oxydating organic contaminants of the Grade 1 comprises:
   adding and mixing organic amendment and maintaining a temperature of about 35° C., a water content in a range between about 10 and about 20% v/v and a carbon/nitrogen ratio of about 20, in aerobic conditions; and monitoring a content of organic contaminants until the content of organic contaminants reaches a target content;
   B) composting the Grade 1;
   wherein said B) composting the Grade 1 comprises:
   a pasteurization step, said pasteurization step comprising: adding and mixing organic amendment, in aerobic conditions until reaching a temperature in a range between about 50 and about 70° C.; monitoring a moisture content, maintaining a carbon/nitrogen ratio of at least about 20; and monitoring pathogens content and respiration rate
   upon detection of absence of pathogens at a predetermined respiration rate, thereby initiating a stabilization step;
   C) processing the Grade 1 into filler for resin composites, wherein said C) processing the Grade 1 comprises, providing target filler properties requirement of a resin composite, selecting a combination of a resin and a Grade 1 of chemical affinity with the resin and according to the moisture content of the Grade 1, selecting a ratio between the Grade 1 as a filler and the resin; and mixing the Grade 1 with the resin composite at the selected ratio;
   D) separating the Grade 2 into alight stream and a heavy stream based on at least one of a composition and a weight of the particles; and
   E) processing the heavy stream into filler for resin composites by, providing target filler properties requirement of a resin composite, processing the heavy stream to decrease particles sizes; selecting a ratio between the heavy stream as a filler and the resin; and mixing the heavy stream with the resin composite at the selected ratio;
   wherein said screening the raw fines materials comprises selecting a screen geometry depending on a water content of the raw fines materials.

2. The method of claim 1, wherein said screening the raw fines materials comprises hydrocarbons; said A) bio-oxydating organic contaminants comprising monitoring a content of the hydrocarbons until the content of hydrocarbons reaches a target content.

3. The method of claim 1, wherein the raw fines materials comprise bioavailable petroleum hydrocarbons PH, polycyclic aromatic hydrocarbons (PAH) and a monocyclic aromatic hydrocarbons (MAH); said A bio-oxydating organic contaminants comprising monitoring a content of petroleum hydrocarbons, polycyclic aromatic hydrocarbons (PAH) and monocyclic aromatic hydrocarbons (MAH) until the content of bioavailable petroleum hydrocarbons, polycyclic aromatic hydrocarbons (PAH) and monocyclic aromatic hydrocarbons (MAH) stops decreasing.

4. The method of claim 1, wherein the raw fines materials comprise bioavailable at least one of: bioavailable petroleum hydrocarbons (PH), polycyclic aromatic hydrocarbons (PAH); said A) bio-oxydating organic contaminants comprising monitoring a content of the at least one of: petroleum hydrocarbons and polycyclic aromatic hydrocarbons (PAH) until the content of the at least one of: bioavailable petroleum hydrocarbons, polycyclic aromatic hydrocarbons (PAH) stops decreasing.

5. The method of claim 1, wherein the raw fines materials comprise hydrocarbons; said B) composting the Grade 1 comprising monitoring a content of the hydrocarbons until the content of hydrocarbons stop decreasing.

6. The method of claim 1, wherein the raw fines materials comprise bioavailable petroleum hydrocarbons (PH), polycyclic aromatic hydrocarbons (PAH) and a monocyclic aromatic hydrocarbons (MAH); said B) composting the Grade 1 comprising monitoring a content of petroleum hydrocarbons, polycyclic aromatic hydrocarbons (PAH) and monocyclic aromatic hydrocarbons (MAH) until the content of bioavailable petroleum hydrocarbons, polycyclic aromatic hydrocarbons (PAH) and monocyclic aromatic hydrocarbons (MAH) stops decreasing.

7. The method of claim 1, wherein the raw fines materials comprise bioavailable at least one of: bioavailable petroleum hydrocarbons (PH) polycyclic aromatic hydrocarbons (PAH); said B) composting the Grade 1 comprising monitoring a content of the at least one of: petroleum hydrocarbons and polycyclic aromatic hydrocarbons (PAH) until the content of: bioavailable petroleum hydrocarbons and polycyclic aromatic hydrocarbons (PAH) stops decreasing.

8. The method of claim 1, wherein the raw fines materials comprise at least one of: bioavailable petroleum hydrocarbons (PH), polycyclic aromatic hydrocarbons (PAH), and monocyclic aromatic hydrocarbons (MAH).

9. The method of claim 1, where said C) processing the Grade 1 further comprise pre-conditioning the Grade 1, said pre-conditioning the Grade 1 comprising, at least one of: i) decrease particles sizes, and ii) reducing a mean particles size according to the target filler properties requirement.

10. The method of claim 1, wherein said step D) comprises using densimetric separation.

11. The method of claim 1, wherein said step D) comprises separating the Grade 2 into the light stream using densimetric separation; said densimetric separation comprising selecting and controlling input speed, airflow and separating table positioning.

12. A method for processing raw fines materials into fillers for resin composites, comprising, providing target filler properties requirement of a resin composite, screening raw fines materials to Grade 1 comprising fines materials of a size of at most 5 mm; selecting a resin, controlling a water content of the Grade 1 for chemical affinity with the resin, selecting a ratio between the Grade 1 as a filler and the resin; and mixing the Grade 1 with the resin at the selected ratio.

13. The method of claim 12, wherein the resin is one of a thermosetting resin and a liquid resin.

14. The method of claim 12, comprising controlling at least one of: a granulometry and a granulometric homogeneity of the Grade 1 prior to forming the resin composite, according to the target filler properties.

15. A method for removing foreign matter content from raw fines materials, comprising measuring a water content of the raw fines materials, controlling the water content; selecting a geometry for a screen depending on the measured water content, and screening the raw fined particules under 5 mm.

16. The method of claim 15, comprising controlling the water content to a maximum of about 60% v/v.

17. The method of claim 15, comprising controlling the water content to a maximum of about 70% v/v.

\* \* \* \* \*